Oct. 30, 1962   L. J. GRZYCH ETAL   3,061,341
PROPELLER HUB ARRANGEMENT FOR AIRCRAFT
Filed Sept. 2, 1960
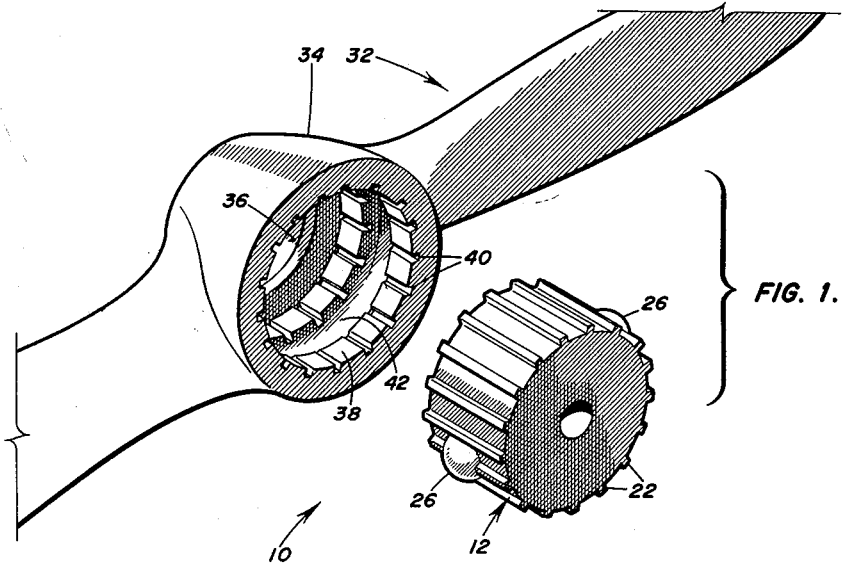
FIG. 1.
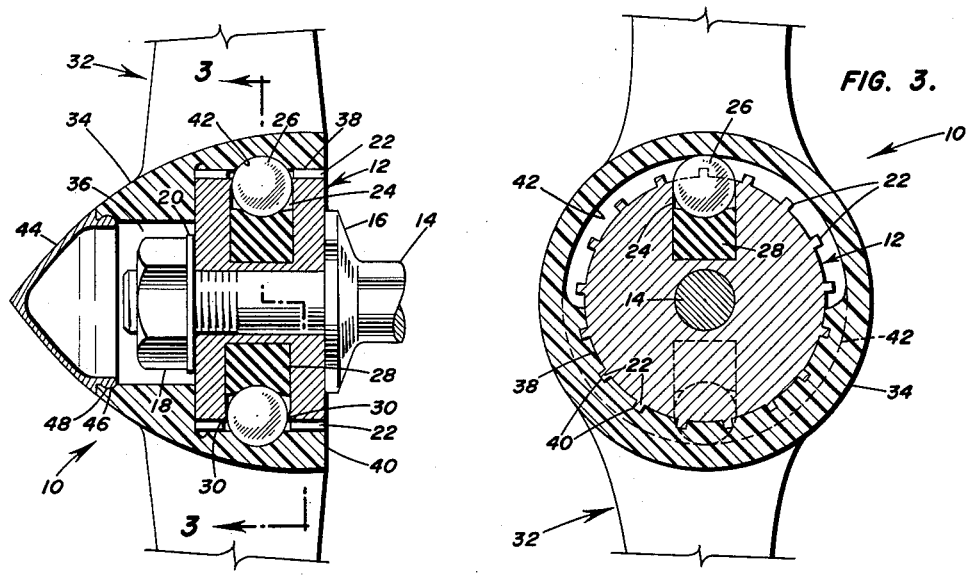
FIG. 2.
FIG. 3.
INVENTORS
LEO J. GRZYCH
STANLEY J. GRZYCH
BY *Walter G. Finch*
ATTORNEY

United States Patent Office 3,061,341
Patented Oct. 30, 1962

3,061,341
PROPELLER HUB ARRANGEMENT
FOR AIRCRAFT
Leo J. Grzych and Stanley J. Grzych, both of
R.R. 1, Schererville, Ind.
Filed Sept. 2, 1960, Ser. No. 53,655
1 Claim. (Cl. 287—53)

This invention relates generally to fluid current motors, and more particularly it pertains to propellers for small aircraft.

In model aircraft and small military target drones, it is of advantage to use a propeller suited for the flight condition. Endurance flights, for example, would require a different propeller pitch than speed trials or high altitude flights. To make changes in the past, it has been necessary to remove the propeller with a wrench and sometimes to unseat the keyed hub with a puller tool.

Often, a broken propeller must be replaced quickly, for example, in the heat of a contest or in target practice without undue delay to the contestants or the gunners. It is also desirable that the propeller in a "dead stick" or "dead motor" landing come to rest parallel with the wing of the aircraft to avoid damage on contact with the ground. This requires correct positioning of the propeller on the motor shaft.

Accordingly, it is an object of the present invention to provide a detented, quick change propeller for small aircraft which requires no tools for replacement thereof.

Another object of this invention is to provide a slip-on hub coupling for a rotary shaft which improves its securement under rotation and which is so designed that it will not slip upon such rotation.

And yet another object of this invention is to provide a propeller hub for rapid multiple choice re-positioning of the propeller with respect to its shaft.

Still another object of the invention is to provide a simple, yet effective centrifugal propeller clutch mechanism which is easily and economically made, provides desirable fly-wheel effect, and which remains in dynamic balance while functioning.

These and other objects and attendant advantages of this invention will become more readily apparent and understood from the accompanying specification and single sheet of drawings in which:

FIG. 1 is an exploded perspective view of an improved propeller hub incorporating features of this invention;

FIG. 2 is a transverse section of the propeller hub of FIG. 1; and

FIG. 3 is a cross-section taken along line 3—3 of FIG. 2.

Referring now to the details of the drawings, reference numeral 10 designates generally an improved quick change propeller hub arrangement incorporating features of this invention. As shown best in FIG. 2, the propeller hub arrangement consists of an axially drilled splined boss 12. The boss 12 is intended to be secured by a lock nut 18, and lockwasher 20 upon the shaft 14 and against a flange 16 of a conventional aircraft motor.

As shown best in FIGS. 2 and 3, the splined boss 12 is radially bored at diametrically opposite points to provide pairs of blind hole receptacles 24. Short cylindrical inserts 28 of resilient material such as neoprene are placed in each receptacle 24, and a hard ball 26, preferably of steel or brass, is inserted on top of each insert. Each ball 26 is captivated by urging it inwardly against its respective resilient insert 28 and peening or staking the edges of the receptacle 24 as indicated at reference numeral 30.

The hub 34 of a propeller 32 is axially provided with a bore 36 and a larger counterbore 38 concentric therewith. The counterbore 38 is serrated with a plurality of equally spaced spline grooves 40 which mate with splines 22 of the boss 12.

A narrow circular locking groove 42, best shown in FIG. 1, is provided in the periphery of the counterbore 38. The groove 42 is preferably machined with a tool having a radius approximately equal to that of the balls 26.

Near the outer end of the bore 36, a circular groove 46 is cut to receive detents 48 formed around the lip of a trim cap or spinner 44 which need not be removed when changing propellers 32.

It will be noted from FIG. 1, the balls 26 protrude in detent fashion from the periphery of the splined boss 12. For this reason, they interfere with the counterbore 38 when the propeller 32 is being installed on the serrated boss 12. Therefore, a "snap-on" pressure is required for full seating of the splined boss 12 in the counterbore 38 of the propeller 32.

With the propeller 32 installed, the balls 26 rest within the locking groove 42 under a slight seating urge from the resilient inserts 28. When the propeller 32 spins, centrifugal action tends to throw the balls 26 radially outward to seat even more firmly in the groove 42. At rest, hand pressure is sufficient to remove the propeller 32 from the splined boss 12.

A wide choice of radial positioning of the propeller 32 upon the splined boss 12 is available because of the multiplicity of mating positions of the splines 22 and spline grooves 40, and it is easy to re-position the propeller 32 for any desired shaft relation. The moving parts of the detent balls 26 are so positioned that no unbalance can occur so they function to centrifugally lock the splined boss 12 to the propeller hub 34.

While the splined boss 12 can be made of light metal or plastic, it may be desirable to fabricate it of a heavier material such as steel and utilize the fly-wheel effect thereof, for better motor performance.

In addition to the above, it is to be noted that the propeller 32, and its hub 34 can be formed of plastic materials for use in model aircraft, if desired.

Obviously, many modifications and variations of the present invention are possible in light of the above teachings. It is, therefore, to be understood that within the scope of the appended claim the invention may be practiced otherwise than as specifically described.

What is claimed is:

In combination, a drive shaft, an axially displaceable airscrew type propeller mounted on said drive shaft, said air screw type propeller producing a major part of its output as end thrust on said drive shaft and having a hub with a dual track multi-splined counterbore provided therein at one end of said hub, said dual track multi-splined counterbore having an annular recess formed in its surface intermediate its ends and being bounded by said dual track multi-splined counterbore, a splined drive boss on said drive shaft for engaging with said dual track multi-splined counterbore in said hub, an oppositely positioned pair of receptacles in the outer periphery of said splined boss, a biasable detent means including a ball in each receptacle, said dual track multi-splined balls being engageable in said annular recess of said counterbore for holding said propeller on said boss of said drive shaft due to the centrifugal bias produced on said balls upon rotation of said propeller and for permitting multiple positioning of said propeller relative to said drive shaft, and resilient means under each said biasable detent means for urging said biasable detent means outwardly and in said annular recess of said dual track multi-splined counterbore of the hub to hold said propeller on said drive shaft during stationary condition of said drive shaft.

References Cited in the file of this patent

UNITED STATES PATENTS

| | | |
|---|---|---|
| 1,741,969 | Bellows | Dec. 31, 1929 |
| 2,164,426 | Renfroe | July 4, 1939 |
| 2,218,275 | Woodin | Oct. 15, 1940 |

FOREIGN PATENTS

| | | |
|---|---|---|
| 584,492 | France | Nov. 21, 1924 |

UNITED STATES PATENT OFFICE
CERTIFICATE OF CORRECTION

Patent No. 3,061,341                       October 30, 1962

Leo J. Grzych et al.

It is hereby certified that error appears in the above numbered patent requiring correction and that the said Letters Patent should read as corrected below.

Column 3, line 2, strike out "dual track multi-splined" and insert the same after "said", second occurrence, in line 3, same column 3.

Signed and sealed this 7th day of May 1963.

(SEAL)
Attest:

ERNEST W. SWIDER
Attesting Officer

DAVID L. LADD
Commissioner of Patents